(12) United States Patent
Biber et al.

(10) Patent No.: US 9,439,348 B2
(45) Date of Patent: Sep. 13, 2016

(54) AUTONOMOUS WORKING DEVICE

(75) Inventors: Peter Biber, Poltringen (DE); Steffen Petereit, Freiberg (DE); Christoph Koch, Stuttgart (DE); Amos Albert, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 69 days.

(21) Appl. No.: 14/343,409

(22) PCT Filed: Jul. 16, 2012

(86) PCT No.: PCT/EP2012/063882
§ 371 (c)(1),
(2), (4) Date: Jun. 20, 2014

(87) PCT Pub. No.: WO2013/034345
PCT Pub. Date: Mar. 14, 2013

(65) Prior Publication Data
US 2014/0316634 A1 Oct. 23, 2014

(30) Foreign Application Priority Data
Sep. 9, 2011 (DE) .......................... 10 2011 082 416

(51) Int. Cl.
*G01C 22/00* (2006.01)
*G05D 1/00* (2006.01)
*A01D 34/00* (2006.01)

(52) U.S. Cl.
CPC .................................. *A01D 34/008* (2013.01)

(58) Field of Classification Search
CPC ........................................ A01D 34/008
USPC ........................................... 701/203
See application file for complete search history.

(56) References Cited

FOREIGN PATENT DOCUMENTS

| | | |
|---|---|---|
| CN | 101091428 A | 12/2007 |
| CN | 201142841 Y | 11/2008 |
| CN | 101828464 A | 9/2010 |
| DE | 10 2007 023 157 A1 | 11/2008 |
| DE | 10 2008 011 947 A1 | 9/2009 |
| DE | 10 2008 001 813 A1 | 11/2009 |
| EP | 1 892 599 A2 | 2/2008 |
| GB | 2 386 970 A | 10/2003 |

OTHER PUBLICATIONS

International Search Report corresponding to PCT Application No. PCT/EP2012/063882, mailed Oct. 12, 2012 (German and English language document) (7 pages).

*Primary Examiner* — Maceeh Anwari
(74) *Attorney, Agent, or Firm* — Maginot, Moore & Beck LLP

(57) ABSTRACT

An autonomous working device, in particular an autonomous lawn mower, comprising a computing unit. The autonomous working device is configured to cover a surface to be treated in strips. The computing unit is configured to adjust an overlap of the strips according to at least one parameter.

20 Claims, 3 Drawing Sheets

AUTONOMOUS WORKING DEVICE

This application is a 35 U.S.C. §371 National Stage Application of PCT/EP2012/063882, filed on Jul. 16, 2012, which claims the benefit of priority to Serial No. DE 10 2011 082 416.2, filed on Sep. 9, 2011 in Germany, the disclosures of which are incorporated herein by reference in their entirety.

BACKGROUND

An autonomous working device, in particular an autonomous lawnmower, which comprises a computing unit and is provided for traveling in strips along a surface to be processed has already been proposed.

SUMMARY

The disclosure is based on an autonomous working device, in particular on an autonomous lawnmower, which comprises a computing unit and is provided for traveling in strips along a surface to be processed.

It is proposed that the computing unit be provided for setting an overlap of the strips as a function of at least one parameter. An "autonomous working device" is to be understood in this context as meaning, in particular, a device which at least partially automatically performs work such as, in particular, starts automatically, ends automatically and/or automatically selects at least one parameter such as, in particular, a distance parameter and/or a reversal point etc. The device is particularly preferably provided for traveling along a surface and performing work on this surface. In this context, various autonomous working devices which appear appropriate to a person skilled in the art are conceivable, such as, for example, an autonomous sweeping machine, an autonomous vacuum cleaner or an autonomous swimming bath cleaning machine etc., in particular, the autonomous working device is, however, formed by an autonomous lawnmower. In addition, a "computing unit" is to be understood as meaning, in particular, a unit having an information input, an information processing means and/or an information output. The computing unit advantageously has at least one processor, one memory, input and output means, further electrical components, one operating program, closed-loop control routines, open-loop control routines and/or calculation routines. The components of the computing unit are preferably arranged on a common circuit board and/or are advantageously arranged in a common housing. The computing unit is preferably arranged inside part of the autonomous working device which is moved in order to perform work, while being driven over the surface to be processed. However, alternatively and/or additionally, the computing unit could also be arranged outside the part of the autonomous working device such as, for example, in a remote control means and/or a fixed station. A connection between the part and the computing unit of the autonomous working device can be made, in particular, via a wireless connection. As a result, in particular the computing unit of the autonomous working device can be exported out of the part of the autonomous working device in order to keep loading by dirt low. In addition, as a result the weight of the part of the autonomous working device can be kept low. A "surface to be processed" is to be understood in this context as meaning, in particular, a surface which defines a working area. An "overlap" is to be understood in this context as meaning, in particular, a width of a surface which defines an overlapping region of two strips which run at least approximately parallel to one another. In addition, an overlap in the case of a constant strip width can also be defined by a difference between a strip width and a relative distance between two strips. A "relative distance between two strips" is to be understood in this context as meaning, in particular, a distance between the center lines of the strips. A "parameter" is to be understood in this context as meaning, in particular, at least one value which defines at least one characteristic property and/or a characteristic variable and/or an influencing variable.

The configuration of the autonomous working device according to the disclosure can particularly advantageously implement an efficient and effective working step of the autonomous working device.

The computing unit can preferably be provided for adapting a speed and/or a torque of a working unit of the autonomous working device as a function of the overlap. As a result, it is advantageously possible in the case of a large overlap to increase a speed, and in the case of a small overlap to reduce a speed. In addition, it would also be conceivable to adapt a speed and/or a torque by means of further parameters which are required for calculating an overlap.

It is also proposed that the computing unit be provided for setting the overlap in a differentiated fashion for various partial regions and/or for various strips of the surface to be processed. The partial region preferably has at least one approximately constant parameter. As a result, a surface to be processed can advantageously be processed in a differentiated fashion with respect to the overlap in order to achieve maximum efficiency.

The computing unit is preferably provided for setting the overlap of a strip as a function of at least one specific parameter of the corresponding strip. In this context, a "specific parameter" is to be understood as meaning, in particular, a parameter which can change from one strip to another strip but remains at least approximately the same over a corresponding strip. As a result, an overlap with individual strips can advantageously be adapted to the respective strip.

In addition it is proposed that the computer unit be provided for taking into account at least one strip length parameter. A "strip length parameter" is to be understood in this context as meaning, in particular, a parameter which represents directly or indirectly a characteristic variable for a strip length and/or preferably directly or indirectly allows an expected strip length to be inferred and/or is preferably formed by the expected strip length. In this context, an "expected strip length" is to be understood here as meaning, in particular, a strip length which the autonomous working device travels along without incidents which are unforeseen for the working device, such as, for example, an unknown obstacle, on the surface to be processed. A "strip length" is to be understood in this context as meaning, in particular, a length of a magnitude which the working device travels along without a significant change in direction. In this context, "without a significant change in direction" is to be understood as meaning, in particular, a change in direction by less than 10°, preferably by less than 5° and particularly preferably by less than 2°. As a result, a strip-specific parameter can advantageously be taken into account, as a result of which an overlap can be appropriately and efficiently adapted.

In this context it is conceivable, in particular, that the computing unit is provided for setting a larger overlap in the case of an expected long strip length than in the case of an expected short strip length. As a result, by means of the expected long strip length it is possible to ensure that the surface is completely processed up to the nearest strip. In the case of an expected short strip length it is therefore possible, in particular, to keep processing time short and loading of the surface to be processed low.

Furthermore, it is proposed that the computing unit be provided for taking into account at least one underlying surface parameter. An "underlying surface parameter" is to be understood in this context as meaning, in particular, a parameter which depends at least on a quality and/or a property of the underlying surface. Various qualities and/or properties which appear appropriate to a person skilled in the art are conceivable, but they are to be understood as meaning, in particular, a coefficient of adhesion and/or a moisture level and/or particularly advantageously a grass height and/or grass density. As a result, specific properties of the surface to be processed can be advantageously taken into account.

It is conceivable here, in particular, that the computing unit is provided for setting a large overlap in the case of high and dense grass as opposed to low and sparse grass. As a result, overloading of the mower motor can be advantageously avoided.

It is also proposed that the computing unit have at least one sensor which is provided for sensing at least one parameter. A "sensor" is to be understood in this context as meaning, in particular, a unit which is provided for registering at least one characteristic variable and/or one physical property, wherein the registration can be active, such as can occur, in particular, as a result of the generation and emission of an electrical measurement signal, and/or passive such as can occur, in particular, as a result of detection of changes in properties of a sensor component. As a result, an underlying surface parameter can be taken into account actively and, in particular, dynamically in a reliable and completely autonomous fashion.

In addition it is proposed that the computing unit have at least one input unit which is provided for registering manual inputs of parameters by an operator. An "input unit" is to be understood in this context as meaning, in particular, a unit which has at least one operator control element and preferably at least one output element such as, in particular, a display. The input element is preferably connected directly to the computing unit. Alternatively or additionally, the input unit and/or at least one second input unit could be arranged separately from the computing unit and, in particular, separately from the part of the autonomous working device which, in order to perform work, is moved in a driven fashion over the surface to be processed. The input unit could be arranged, for example, in a remote control means and/or in a fixed station of the autonomous working device. Transmission of information to the computing unit could occur here via a cableless radio link and/or via an interface. In this context, a "fixed station" is to be understood as meaning, in particular, a station of the autonomous working device which is provided for registering the part of the autonomous working device during a rest phase. The station is preferably provided for filling an energy accumulator of the part of the autonomous working device. Filling can occur, for example, by means of refueling, changing an energy carrier and/or charging an accumulator; however, other methods which appear appropriate to a person skilled in the art are also conceivable. The station is particularly preferably arranged in an edge region of the surface to be processed and serves as a starting point and/or end point for the part of the autonomous working device. As a result, parameters can be input easily and comfortably by an operator.

The configuration permits the autonomous working device to be advantageously set to the requirement of an operator. As a result, in particular user-specific prescriptions can be registered.

It is also proposed that the computing unit be provided for taking into account a desired result, which has been input into the input unit, during the setting of the overlap. In this context, a "desired result" is to be understood as meaning, in particular, a result which is desired by an operator such as, for example, a specific time prescription and/or a specific level of quality and/or gentle treatment of the lawn. As a result, by means of simple input by an operator it is advantageously possible to produce complex peripheral conditions. In addition, the prescriptions of the operator can consequently be taken into account without the operator inputting a plurality of parameters.

Furthermore, it is proposed that the computing unit be provided for taking into account an overlap parameter, which has been input into the input unit, for the surface to be processed and/or for various partial regions and/or conditions of the surface to be processed. If, for example, an overlap parameter which reduces an overlap is input by an operator by means of the input unit, a mowing time can be shortened, wear can be reduced and/or the lawn can be treated gently. On the other hand, if an overlap is made larger, complete processing of the surface to be processed can be ensured. An "overlap parameter" is to be understood in this context as meaning, in particular, a parameter which directly determines dimensioning of an overlap. "Conditions of the surface to be processed" is to be understood as meaning, in particular, particular peripheral conditions which change depending on position and/or orientation despite the position of the autonomous working device remaining the same. This can be understood as meaning, for example, conditions such as a sloping inclination in which it is possible to differentiate between being parallel to a slope and perpendicular to the slope. As a result, differentiating conditions of the surface to be processed can easily be input by an operator, as a result of which in turn sensors and other detection units can be dispensed with.

The computing unit can preferably also be provided for taking into account, during the setting of the overlap, a speed parameter which is selected by an operator. As a result, overloading of the drive motor can be advantageously avoided.

In addition it is proposed that the computing unit be provided for determining its own position within an outline map and calculating an intersection point of an expected strip direction with the outline map during the determination of an expected strip length before a strip is traveled along. In this context, an "expected strip length" is to be understood as meaning, in particular, a strip length which the autonomous working device travels along the surface to be processed without incidents which are unpredictable for it such as, for example, an unknown obstacle. An "outline map" is to be understood in this context as meaning, in particular, a virtual sensing line which is stored in the memory of the computing unit and which represents a boundary of the surface to be processed. Furthermore, an "expected strip direction" is to be understood as meaning, in particular, an expected direction of movement of the autonomous working device during a subsequent strip. As a result it is advantageously possible to calculate an expected strip length easily.

BRIEF DESCRIPTION OF THE DRAWINGS

Further advantages can be found in the following description of the drawings. The drawings illustrate an exemplary embodiment of the disclosure. The drawings, the description and the claims contain numerous features in combination. A person skilled in the art will expediently also consider the features individually and combine them to form further appropriate combinations.

In the drawings.

DETAILED DESCRIPTION

Figure 1:
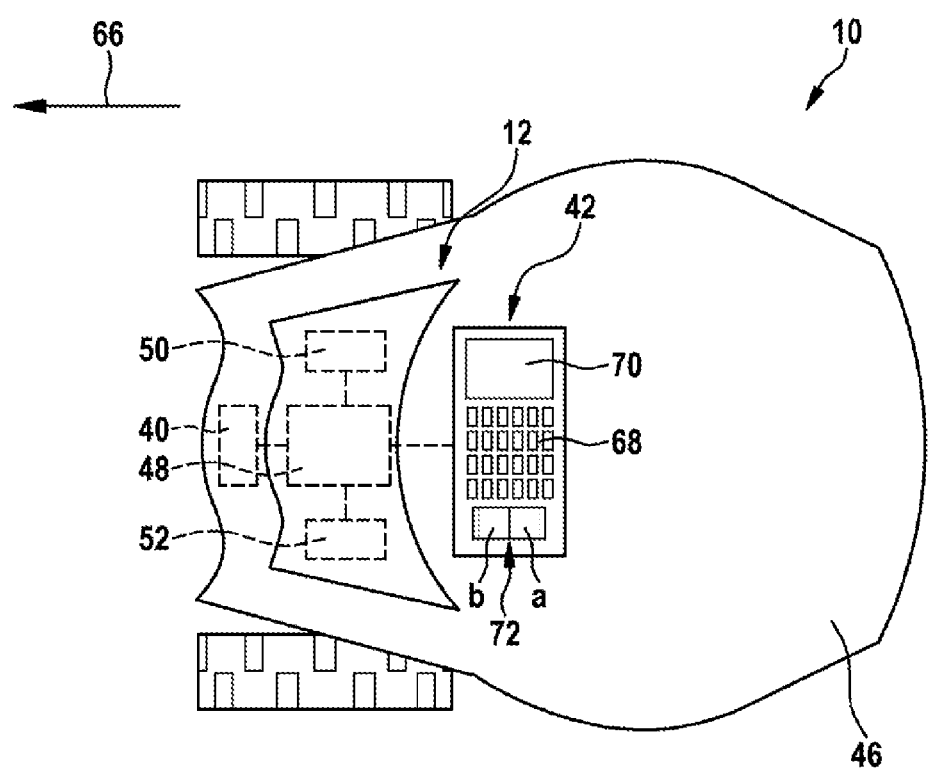
FIG. 1 shows an autonomous working device according to the disclosure with a computing unit in a schematic illustration.
Figure 2:
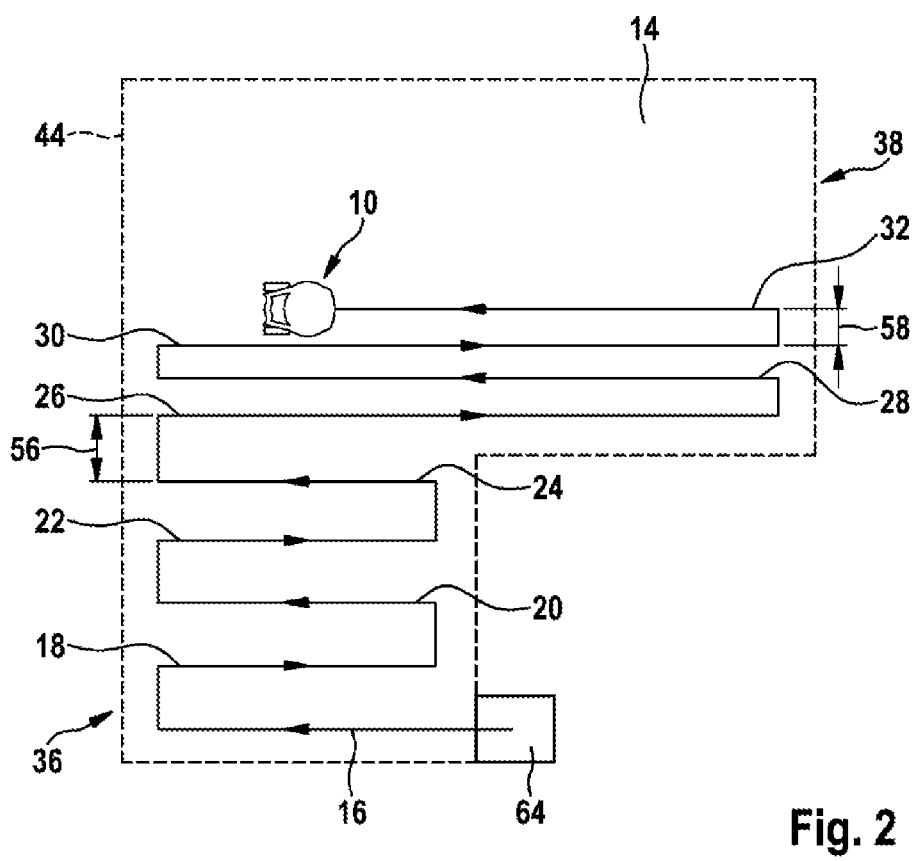
FIG. 2 shows the autonomous working device according to the disclosure on a surface to be processed, in a schematic illustration.

FIG. 1 shows an autonomous working device 10 according to the disclosure with a computing unit 12. The autonomous working device 10 is formed by an autonomous lawnmower. The autonomous working device 10 has a computing unit 12 and is provided for traveling in strips 16, 18, 20, 22, 24, 26, 28, 30, 32 along a surface 14 to be processed (FIG. 2). In addition, the autonomous working device 10 has a drive motor (not shown further). The surface 14 to be processed is formed by a lawn surface. The computing unit 12 is arranged inside a housing 46 of the autonomous working device 10. The computing unit 12 has a computing core 48 and a memory element 50. The computing core 48 serves to process information, and the memory element 50 serves to store information. The computing core 48 and the memory element 50 are connected via a line. In addition, the computing unit 12 is connected to a location unit 52 which is also located in the housing 46 of the autonomous working device 10 and is provided for determining the position of the autonomous working device 10. The location unit 52 is connected to the computing core 48 of the computing unit 12 via a line. The computing unit 12 is provided for setting an overlap 34 of the strips 16, 18, 20, 22, 24, 26, 28, 30, 32 as a function of a plurality of parameters. The overlap 34 is set by a change in the lateral movement of the autonomous working device 10 between the strips 16, 18, 20, 22, 24, 26, 28, 30, 32.

Figure 3:
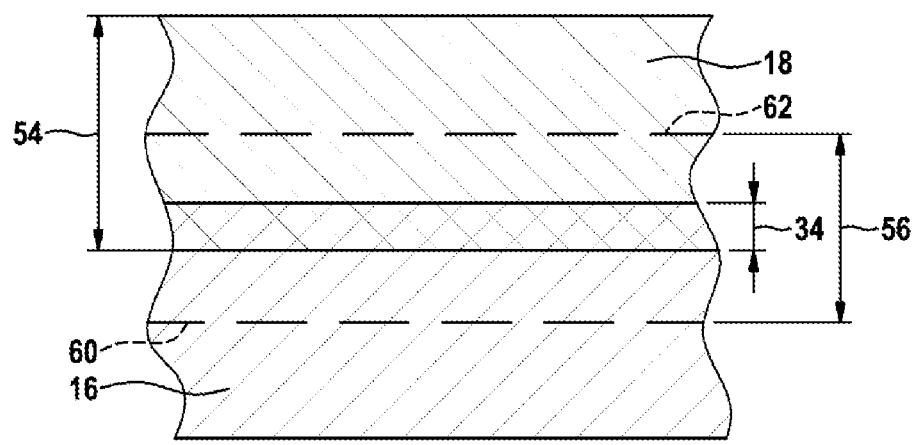
FIG. 3 shows a partial detail of two schematically illustrated strips, which overlap one another, of the autonomous working device.

The overlap 34 is defined by a difference between a strip width 54 and a relative distance 56, 58 between two strips 16, 18, 20, 22, 24, 26, 28, 30, 32. The relative distance 56, 58 between two strips 16, 18, 20, 22, 24, 26, 28, 30, 32 represents the distance 56, 58 between center lines 60, 62 of the strips 16, 18, 20, 22, 24, 26, 28, 30, 32. FIG. 3 represents here merely a partial detail of the two strips 16, 18. The strips 16, 18 have an identical strip width 54 and are spaced apart relative to one another by the distance 56, resulting in the overlap 34.

In addition, the computing unit 12 is provided for setting the overlap 34 in a differentiated fashion for various partial regions 36, 38 and for various strips 16, 18, 20, 22, 24, 26, 28, 30, 32 of the surface 14 to be processed. In the case of a surface 14 to be processed as shown in FIG. 2, various overlaps 34 are set for two partial regions 36, 38, as a result of which the relative distances 56, 58 between the strips 16, 18, 20, 22, 24, 26, 28, 30, 32 also change. The surface 14 to be processed has a narrow partial region and a wide partial region 38 when considered perpendicularly to the strips 16, 18, 20, 22, 24, 26, 28, 30, 32 of the autonomous working device 10. A station 64 of the autonomous working device 10 is arranged at an end of the narrow partial region 36 facing away from the wide partial region 38.

The computing unit 12 is provided for taking into account a strip length parameter. The computing unit 12 is provided for taking into account an expected strip length during the setting of the overlap 34. The strip lengths in the wide partial region 38 are long compared to the strip lengths in the narrow partial region 36. Accordingly, the strips 26, 28, 30, 32 in the wide partial region 38 have a large overlap compared to the overlaps 34 of the narrow partial region 36. Accordingly, the strips 26, 28, 30, 32 of the wide partial region 38 have a small relative distance 58 between the strips 26, 28, 30, 32 compared to the strips 16, 18, 20, 22, 24 of the narrow partial region 36.

The computing unit 12 is provided for setting the overlap 34 of one of the strips 16, 18, 20, 22, 24, 26, 28, 30, 32 as a function of a specific parameter of the corresponding strip 16, 18, 20, 22, 24, 26, 28, 30, 32. The computing unit 12 is provided for setting the overlap 34 of one of the strips 16, 18, 20, 22, 24, 26, 28, 30, 32 as a function of an expected strip length of the corresponding strip 16, 18, 20, 22, 24, 26, 28, 30, 32.

Furthermore, the computing unit 12 is provided for taking into account an underlying surface parameter. The computing unit 12 is provided for taking into account a current grass height and grass density during the setting of the overlap 34. In the case of high and dense grass, an overlap 34 which is large compared to low and sparse grass is set in order to avoid overloading the drive motor (not shown further).

In addition, the computing unit 12 has a sensor 40 which is provided for sensing at least one parameter. The sensor 40 is provided for sensing a grass height and grass density. The sensor 40 is arranged in the housing 46 of the autonomous working device 10 and is connected via a line to the computing core 48 of the computing unit 12. The sensor 40 is arranged in an area of the housing 46 at the front considered in a direction of travel 66. The housing 46 has an opening (not shown further) by means of which the sensor 40 can sense a grass height and grass density.

The computing unit 12 has an input unit 42 which is provided for registering manual inputs of parameters by an operator. The input unit 42 is arranged on the housing 46 of the autonomous working device 10 and is connected to the computing core 48 of the computing unit 12 via a line. The input unit 42 has a keypad 68, a display 70 and a rocker switch 72.

The computing unit 12 is provided for taking into account a desired result, which has been input into the input unit 42, during the setting of the overlap 34. An operator can input a desired result into the input unit 42. An input is made by means of the rocker switch 72 of the input unit 42. The rocker switch 72 has a position a and a position b. If the rocker switch 72 is in a position a, a high quality level of the mowing result is desired by an operator. If the rocker switch 72 is in a position b, an energy saving mode is desired by an operator. The rocker switch 72 can only be in one of the two positions a, b. A position of the rocker switch 72 is included in the calculation for the setting of the overlap 34 by the computing unit 12.

The computing unit 12 is provided for taking into account an overlap parameter, which has been input into the input unit 42, for the surface 14 to be processed and for various partial regions 36, 38, and conditions of the surface 14 to be processed. An overlap parameter can be input into the input unit 42 by means of the keypad 68. The overlap parameter can be set either to the entire surface 14 to be processed or to a partial region 36, 38 in which the overlap parameter is to be applied. The overlap parameter is set for the corresponding partial region 36, 38 directly by the computing unit 12. All further parameters sensed by the computing unit 12 or all further operator control parameters are not taken into account for this.

At the start of a mowing process, the presence of overlap parameters which have been input by an operator is checked by the computing unit 12. If overlap parameters are present, the mowing process is carried out according to these prescriptions, and further parameters are not taken into account here. If there is no overlap parameter which has been input by an operator, a position a, b of the rocker switch 72 of the input unit 42 is checked by the computing unit 12. Depending on the position a, b of the rocker switch 72, a fixed overlap value is stored. In the position a, the overlap value is large compared to the position b. Subsequently, a grass height and grass density is sensed by means of the sensor 40. A further overlap value is calculated on the basis of the sensed grass parameters by the computing unit 12. The overlap values of the rocker switch 72 and of the sensed grass parameters are averaged to form an initial overlap. In a next step, the mowing process is started. Before one of the strips 16, 18, 20, 22, 24, 26, 28, 30, 32 is traveled along in each case, an expected strip length is calculated. The computing unit 12 is provided for determining its own position within an outline map 44 and calculating an intersection point of an expected strip direction with the outline map 44 during the determination of an expected strip length before one of the strips 16, 18, 20, 22, 24, 26, 28, 30, 32 is traveled along. A distance between the intersection point and the position yields an expected strip length. A strip length overlap is calculated on the basis of this strip length by means of the computing unit 12, and is temporarily reconciled with the initial overlap. The resulting overlap 34 is set for this strip 16, 18, 20, 22, 24, 26, 28, 30, 32. After the conclusion of the strip 16, 18, 20, 22, 24, 26, 28, 30, 32, the resulting overlap 34 is reset and a new resulting overlap 34 is calculated and set for a new strip 16, 18, 20, 22, 24, 26, 28, 30, 32 by means of the strip length and the initial overlap.

The invention claimed is:

1. An autonomous working device comprising:
   a housing;
   a plurality of wheels supporting the housing:
   a drive motor operably connected to the plurality of wheels; and
   a computing unit including (i) a memory having program instructions stored therein, (ii) at least one manual input for receiving manual inputs of at least one parameter from an operator, and (iii) a processor operably connected to the memory and configured to execute the program instructions to
   determine an overlap of a plurality of strips along a surface to be processed autonomously by the autonomous working device based upon at least one parameter received by the manual input, and
   control the autonomous working device to travel in the plurality of strips along the surface to be processed based on the determined overlap.

2. The autonomous working device as claimed in claim 1, wherein the processor is further configured to execute the program instructions to determine the overlap in a differentiated fashion for at least one of;
   various partial regions of the surface to be processed; and
   various strips of the plurality of strips.

3. The autonomous working device as claimed in claim 1, wherein the processor is further configured to execute the program instructions to determine the overlap based at least in part upon at least one strip length parameter.

4. The autonomous working device as claimed in claim 3, wherein the processor is further configured to execute the program instructions to:
   determine a position of the autonomous working device within an outline map stored in the memory; and
   calculate an intersection point of an expected strip direction with the outline map during determination of the overlap.

5. The autonomous working device as claimed in claim 1, wherein the processor is further configured to execute the program instructions to determine the overlap based at least in part upon at least one underlying surface parameter.

6. The autonomous working device as claimed in claim 5, wherein:
   the computing unit includes at least one sensor operably connected to the processor, the at least one sensor configured to sense at least one sensor parameter; and
   the processor is further configured to execute the program instructions to determine the overlap of the plurality of strips based upon the at least one sensor parameter.

7. The autonomous working device of claim 6, wherein the at least one parameter is a height of grass to be cut by the autonomous working device.

8. The autonomous working device as claimed in claim 1, wherein:
   the at least one parameter comprises a desired result; and
   the processor is further configured to execute the program instructions to determine the overlap based at least in part upon the desired result.

9. The autonomous working device as claimed in claim 1, wherein the at least one parameter comprises an overlap parameter, which has been input into the input unit for at least one of:
   the surface to be processed;
   various partial regions of the surface to be processed; and
   conditions of the surface to be processed.

10. A method of controlling an autonomous working device, comprising:
    manually inputting at least one overlap parameter into a manual input of the device, the at least one overlap parameter selected from a group of overlap parameters consisting of (i) a surface to be processed, (ii) various partial regions of the surface to be processed, and (iii) conditions of the surface to be processed;
    determining with a processor of the device an overlap of a plurality of strips along the surface to be processed based upon the input at least one overlap parameter by executing with the processor program instructions stored in a memory, and
    controlling the autonomous working device with the processor to travel in the plurality of strips along the surface to be processed based on the determined overlap.

11. An autonomous working device comprising:
    a housing;
    a plurality of wheels supporting the housing:
    a drive motor operably connected to the plurality of wheels; and a computing unit including (i) a memory having program instructions stored therein, and (ii) a processor operably connected to the memory and configured to execute the program instructions to determine an overlap of a plurality of strips along a surface to be processed autonomously by the autonomous working device based upon a height of grass to be cut by the autonomous working device, and control the autonomous working device to travel in the plurality of strips along the surface to be processed based on the determined overlap.

12. The autonomous working device of claim 11, further comprising:
at least one sensor operably connected to the processor, the at least one sensor configured to sense the height of grass to be cut.

13. The autonomous working device of claim 12, further comprising:
a manual input operably connected to the processor, wherein the processor is further configured to execute the program instructions to determine the overlap based upon at least one manual input parameter input to the manual input by an operator.

14. The autonomous working device of claim 13, wherein the at least one manual input parameter comprises a speed of the device.

15. The autonomous working device of claim 13, wherein:
the at least one manual input parameter comprises a desired result; and
the processor is further configured to execute the program instructions to determine the overlap based at least in part upon the desired result.

16. The autonomous working device of claim 13, wherein:
the manual input comprises a rocker switch moveable between a first position and a second position; and
the second position is associated with an energy saving mode.

17. The autonomous working device of claim 13, wherein:
the at least one manual input comprises an overlap parameter, which has been input into the input unit for at least one of:
the surface to be processed;
various partial regions of the surface to be processed; and
conditions of the surface to be processed.

18. The autonomous working device of claim 17, further comprising:
at least one sensor operably connected to the processor, the at least one sensor configured to sense the height and density of grass to be cut, wherein the processor is further configured to execute the program instructions to determine the overlap of the plurality of strips based upon the density of the grass to be cut.

19. The autonomous working device of claim 11, wherein the processor is further configured to execute the program instructions to determine the overlap based upon a density of grass to be cut by the autonomous working device.

20. The autonomous working device of claim 19, further comprising:
at least one sensor operably connected to the processor, the at least one sensor configured to sense the height and density of grass to be cut.

* * * * *